United States Patent
Tzou et al.

(10) Patent No.: US 9,898,038 B2
(45) Date of Patent: Feb. 20, 2018

(54) ELECTRONIC APPARATUS HAVING A BASE

(71) Applicants: Jyh-Chyang Tzou, Taipei (TW); Hsin Yeh, Taipei (TW); Chia-Shin Weng, Taipei (TW); Wei-Hao Lan, Taipei (TW); Tsai-Yu Lin, Taipei (TW); Yuan-Ping Chu, Taipei (TW)

(72) Inventors: Jyh-Chyang Tzou, Taipei (TW); Hsin Yeh, Taipei (TW); Chia-Shin Weng, Taipei (TW); Wei-Hao Lan, Taipei (TW); Tsai-Yu Lin, Taipei (TW); Yuan-Ping Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 44 days.

(21) Appl. No.: 15/000,045

(22) Filed: Jan. 19, 2016

(65) Prior Publication Data
US 2016/0282909 A1 Sep. 29, 2016

Related U.S. Application Data

(60) Provisional application No. 62/137,178, filed on Mar. 23, 2015.

(51) Int. Cl.
*G06F 1/16* (2006.01)
*G06F 3/02* (2006.01)

(52) U.S. Cl.
CPC .......... *G06F 1/1626* (2013.01); *G06F 1/1632* (2013.01); *G06F 1/1654* (2013.01); *G06F 3/0202* (2013.01)

(58) Field of Classification Search
CPC ......... G02F 1/133382; G02F 1/133385; G06F 1/1601; G06F 2200/1631; G06F 1/1675; G06F 1/206; H05K 7/20954–7/2099
See application file for complete search history.

(56) References Cited

U.S. PATENT DOCUMENTS 5,534,891 A * 7/1996 Takano ................. G06F 1/1616
345/169
5,729,480 A * 3/1998 Katoh ................... G06F 1/1616
708/142

(Continued)

FOREIGN PATENT DOCUMENTS

| TW | I318095 | 12/2009 |
| TW | I347393 | 8/2011 |
| TW | 201412222 | 3/2015 |

OTHER PUBLICATIONS

"Office Action of Taiwan Counterpart Application", dated Jun. 1, 2016, pp. 1-6.

*Primary Examiner* — Robert J Hoffberg
*Assistant Examiner* — Matt Dhillon
(74) *Attorney, Agent, or Firm* — JCIPRNET

(57) ABSTRACT

An electronic apparatus includes a base and an electronic device. The base includes a first main body and at least one first connection portion. The first connection portion includes a rotating component, and the rotating component is pivoted to the first main body and has a driven portion and a positioning portion. The electronic device includes a second main body and at least one second connection portion. The second connection portion includes an elastic component and a positioning trench. The elastic component is connected to the second main body, and the positioning trench is formed on the second main body. When the base supports the electronic device so that the first connection portion is aligned to the second connection portion, the elastic component pushes the driven portion such that the positioning portion is engaged into the positioning trench.

25 Claims, 5 Drawing Sheets

(56) References Cited

U.S. PATENT DOCUMENTS

| | | | | |
|---|---|---|---|---|
| 7,203,059 | B1 * | 4/2007 | Kramer | G06F 1/1616 |
| | | | | 210/303 |
| 8,619,415 | B1 * | 12/2013 | Lam | G06F 1/1616 |
| | | | | 248/917 |
| 9,092,194 | B2 * | 7/2015 | Chan | G06F 1/1616 |
| 9,268,369 | B2 * | 2/2016 | Hirai | G06F 1/1654 |
| 2013/0229100 | A1 * | 9/2013 | Siddiqui | G06F 1/1618 |
| | | | | 312/326 |
| 2014/0293534 | A1 * | 10/2014 | Siddiqui | E05D 7/00 |
| | | | | 361/679.55 |
| 2014/0362539 | A1 * | 12/2014 | Huang | H05K 7/20963 |
| | | | | 361/721 |
| 2015/0346780 | A1 * | 12/2015 | Leon | G06F 1/1681 |
| | | | | 361/679.03 |
| 2017/0003719 | A1 * | 1/2017 | Siddiqui | E05D 11/082 |

* cited by examiner

ELECTRONIC APPARATUS HAVING A BASE

CROSS-REFERENCE TO RELATED APPLICATION

This application claims the priority benefits of U.S. provisional application Ser. No. 62/137,178, filed on Mar. 23, 2015. The entirety of the above-mentioned patent application is hereby incorporated by reference herein and made a part of this specification.

BACKGROUND OF THE DISCLOSURE

1. Field of the Disclosure

The disclosure relates to an electronic apparatus, and more particularly to an electronic apparatus having a base.

2. Description of Related Art

With rapid developments in technology, portable electronic devices, such as tablet personal computers (tablet PCs), smart phones, and the like have been widely used due to its advantages that allow users to carry around and operate easily. In general, the portable electronic device does not have a base which is used for supporting and mostly no physical keyboard is provided for users to operate, thus current designs allow users to operate the portable electronic apparatus with the docking base. The docking base has a function of accommodating the electronic apparatus and charging, and a keyboard module is further provided for users to operate.

In some docking bases, a fixing structure (e.g., a hook) is used for fixing the portable electronic apparatus. However, when the portable electronic apparatus and the docking base are combined together, there may be an undesired gap exists between the portable electronic apparatus and the docking base due to the manufacturing and assembling tolerance, thereby resulting that the portable electronic apparatus on the docking base may be prone to wobble and cause inconvenience in operation.

SUMMARY OF THE DISCLOSURE

The disclosure provides an electronic apparatus capable of preventing the electronic device on the base from wobbling.

The electronic apparatus of the disclosure includes a base and an electronic device. The base includes a first main body and at least one first connection portion. The base includes a rotating component, wherein the rotating component is pivoted to the first main body and has a driven portion and a positioning portion. The electronic device includes a second main body and at least one second connection portion. The second connection portion includes an elastic component and a positioning trench, wherein the elastic component is connected to the second main body, and the positioning trench is formed on the second main body. When the base supports the electronic device so that the first connection portion is aligned to the second connection portion, the elastic component pushes the driven portion, such that the positioning portion is engaged into the positioning trench.

According to one exemplary embodiment of the disclosure, the rotating component has a pivoting portion and is pivoted to the first main body via the pivoting portion, wherein the pivoting portion is located between the driven portion and the positioning portion.

According to one exemplary embodiment of the disclosure, the rotating component has a connecting portion, the connecting portion is composed of a magnetic material or the connecting portion includes a magnetic component, the connecting portion is connected between the pivoting portion and the positioning portion, the second connection portion includes another magnetic component, the another magnetic component is disposed in the second main body, when the first connection portion is aligned to the second connection portion, a magnetic attraction force between the another magnetic component and the connecting portion drives the rotating component to rotate.

According to one exemplary embodiment of the disclosure, the another magnetic component is disposed between the elastic component and the positioning trench.

According to one exemplary embodiment of the disclosure, the second connection portion includes an accommodating trench, the accommodating trench is formed in the second main body and accommodates at least a portion of the elastic component.

According to one exemplary embodiment of the disclosure, the elastic component includes an elastic portion and a propping portion, the elastic portion is connected between the second main body and the propping portion, the propping portion is adapted to prop the driven portion.

According to one exemplary embodiment of the disclosure, the positioning trench has a contact surface therein, the positioning portion has another contact surface, when the positioning portion is engaged into the positioning trench, the another contact surface of the positioning portion is inclined and leans against the contact surface in the positioning trench.

According to one exemplary embodiment of the disclosure, the positioning portion is composed of a magnetic material or the positioning portion includes a magnetic component.

According to one exemplary embodiment of the disclosure, the first connection portion includes another magnetic component, the another magnetic component is disposed in the first main body and aligned to the positioning portion, and the positioning portion is adapted to be restricted via a magnetic attraction force between the another magnetic component and the positioning portion.

According to one exemplary embodiment of the disclosure, the second connection portion includes another magnetic component, the another magnetic component is disposed in the second main body and aligned to the positioning trench, and the positioning portion is adapted to be restricted via a magnetic attraction force between the another magnetic component and the positioning portion.

According to one exemplary embodiment of the disclosure, the positioning portion has a bottom side and a top side opposite to each other, an outer diameter of the positioning portion decreases gradually from the bottom side to the top side.

According to one exemplary embodiment of the disclosure, the positioning trench has an opening end, the positioning portion is adapted to be engaged into the positioning trench from the opening end, an inner diameter of the positioning trench decreases gradually from the opening end to an inside of the positioning trench.

According to one exemplary embodiment of the disclosure, the positioning portion has two first inclined surfaces opposite to each other, the positioning trench has two second inclined surfaces opposite to each other therein, inclinations of the two first inclined surfaces and inclinations of the two second inclined surfaces are the same respectively, when the positioning portion is engaged into the positioning trench, the two first inclined surfaces lean against the two second inclined surfaces respectively.

According to one exemplary embodiment of the disclosure, the positioning portion has at least one recess on each of the two first inclined surfaces.

According to one exemplary embodiment of the disclosure, the first main body has a first leaning surface adjacent to the first connection portion, the second main body has a second leaning surface adjacent to the second connection portion, when the positioning portion is engaged into the positioning trench, the first leaning surface leans against the second leaning surface.

According to one exemplary embodiment of the disclosure, the positioning portion has a first aligning micro structure thereon, the positioning trench has a second aligning micro structure therein, when the positioning portion is engaged into the positioning trench, the first aligning micro structure leans against the second aligning micro structure.

An electronic device connected with a base to form an electronic apparatus is provided. The electronic device includes a main body and at least one connection portion, wherein the connection portion includes an elastic component and a positioning trench, the elastic component is connected to the main body, and the positioning trench is formed on the main body. When the electronic device and the base are connected, the elastic component pushes a rotating component of the base, such that a positioning portion of the rotating component is engaged into the positioning trench of the electronic device.

According to one exemplary embodiment of the disclosure, the connection portion includes an accommodating trench, the accommodating trench is formed in the main body and accommodates at least a portion of the elastic component.

According to one exemplary embodiment of the disclosure, the elastic component includes an elastic portion and a propping portion, the elastic portion is connected between the main body and the propping portion, the propping portion is adapted to prop the rotating component.

According to one exemplary embodiment of the disclosure, the positioning trench has a contact surface therein, when the positioning portion is engaged into the positioning trench, the positioning portion leans against the contact surface in the positioning trench.

According to one exemplary embodiment of the disclosure, the connection portion includes a magnetic component, the magnetic component is disposed in the main body and aligned to the positioning trench, and the positioning portion is adapted to be restricted via a magnetic attraction force between the magnetic component and the positioning portion.

According to one exemplary embodiment of the disclosure, the positioning trench has an opening end, the positioning portion is adapted to be engaged into the positioning trench from the opening end, an inner diameter of the positioning trench decreases gradually from the opening end to an inside of the positioning trench.

According to one exemplary embodiment of the disclosure, the positioning portion has two first inclined surfaces opposite to each other, the positioning trench has two second inclined surfaces opposite to each other therein, inclinations of the two first inclined surfaces and inclinations of the two second inclined surfaces are the same, when the positioning portion is engaged into the positioning trench, the two first inclined surfaces lean against the two second inclined surfaces respectively.

According to one exemplary embodiment of the disclosure, the main body has a leaning surface adjacent to the connection portion, when the positioning portion is engaged into the positioning trench, the base leans against the leaning surface.

According to one exemplary embodiment of the disclosure, the positioning portion has a first aligning micro structure thereon, the positioning trench has a second aligning micro structure therein, when the positioning portion is engaged into the positioning trench, the first aligning micro structure leans against the second aligning micro structure.

In light of the above, according to the electronic apparatus of the disclosure, when the base supports the electronic device, the elastic component of the second connection portion props against the driven portion of the rotating component of the first connection portion, so that the positioning portion of the rotating component is engaged into the positioning trench of the second connection portion, and thereby the electronic device is further firmly positioned onto the base. Through such positioning method, the elastic component may eliminate the manufacturing and assembling tolerance between the base and the electronic device via its elastic deformation capability, so as to avoid an undesired gap existing between the base and the electronic device due to the manufacturing and assembling tolerance, thereby the electronic device supported on the base does not wobble and the user may comfortably operate the electronic apparatus.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
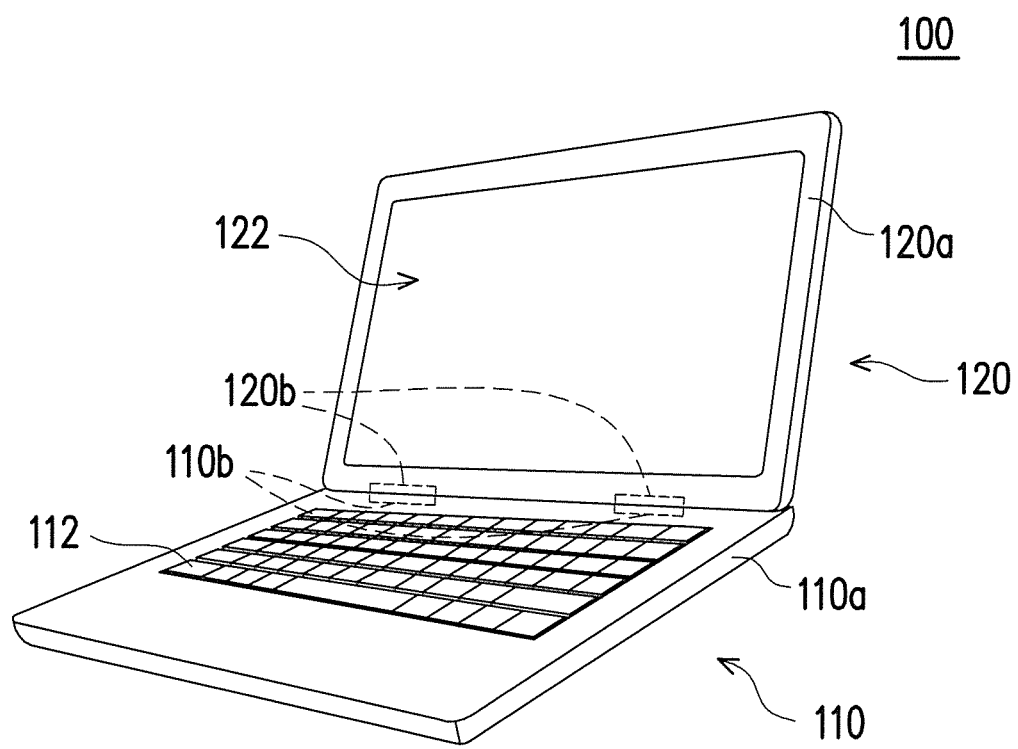
FIG. 1 is a schematic perspective view of an electric apparatus according to an exemplary embodiment of the disclosure.

FIG. 1 is a schematic perspective view of an electric apparatus according to an exemplary embodiment of the disclosure. Referring to FIG. 1, an electronic apparatus 100 according to the present embodiment includes a base 110 and an electronic device 120. The base 110 includes a first main body 110a and at least one first connection portion 110b (depicted as two in the figure), the electronic device 120 includes a second main body 120a and at least one second connection portion 120b. The first main body 110a of the base 110 and the second main body 120a of the electronic device 120 are adapted to be connected to each other via the first connection portion 110b and the second connection portion 120b.

In the present embodiment, the electronic device 120 and the base 110 may be, for example, a tablet personal computer (tablet PC) and a corresponding docking base, respectively. The first main body 110a of the base 110 has an inputting interface 112 (e.g., a keyboard module) for users to operate, and the second main body 120a of the electronic device 120 has a touch display interface 122 (e.g., a touch display surface of a liquid crystal screen) for users to operate. In other embodiments, the electronic device 120 may be other kinds of devices and the base 110 may be the base corresponding to the device, but it is not limited thereto.

Figure 2A:
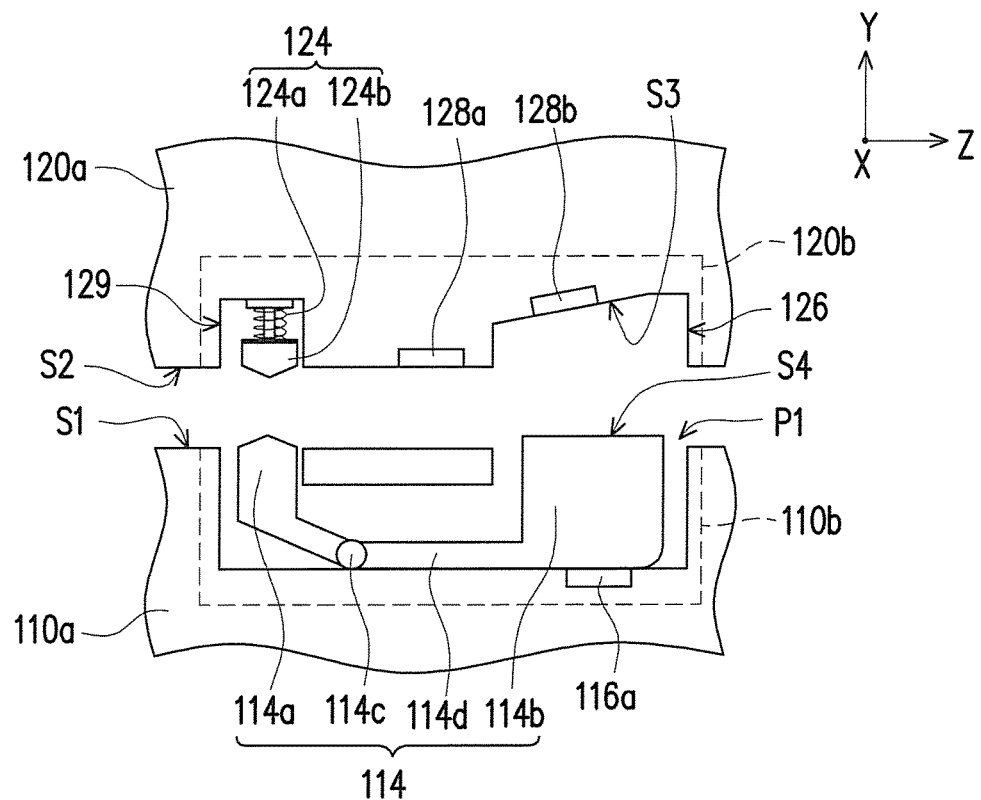
FIG. 2A is a schematic view illustrating that the first connection portion and the second connection portion of FIG. 1 are separated from each other.
Figure 2B:
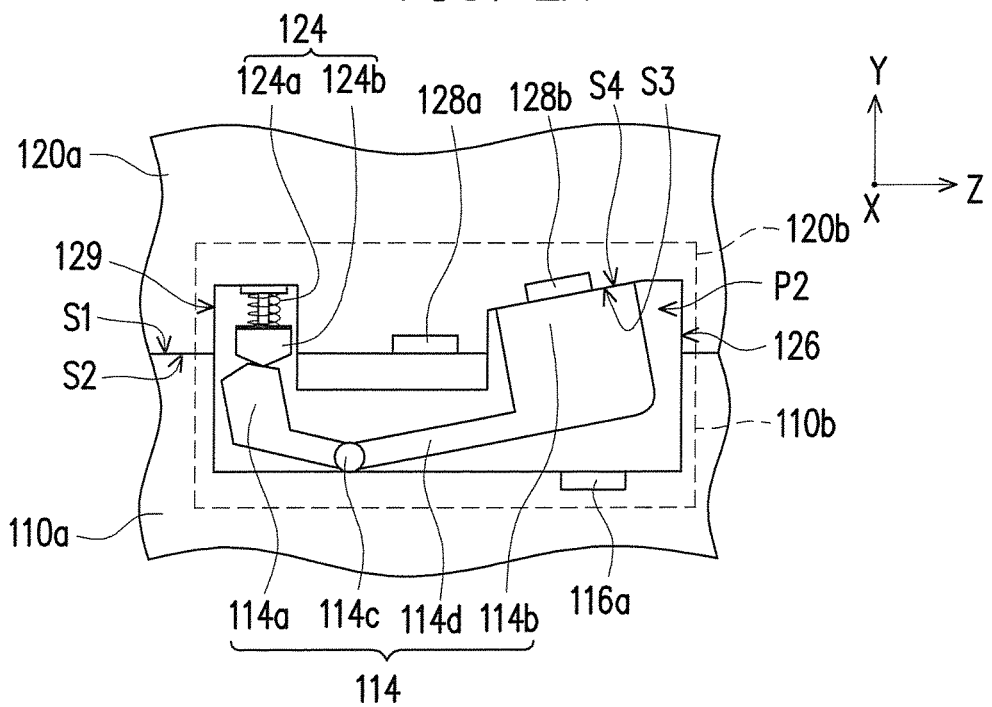
FIG. 2B is a schematic view illustrating that the first connection portion and the second connection portion of FIG. 2A are connected to each other.

FIG. 2A is a schematic view illustrating that the first connection portion and the second connection portion of FIG. 1 are separated from each other. FIG. 2B is a schematic view illustrating that the first connection portion and the second connection portion of FIG. 2A are connected to each other. Referring to FIG. 2A and FIG. 2B, each of the first connection portions 110b includes a rotating component 114, wherein the rotating component 114 is pivoted to the first main body 110a and has a driven portion 114a and a positioning portion 114b. Each of the second connection portions 120b includes an elastic component 124 and a positioning trench 126, wherein the elastic component 124 is connected to the second main body 120a, and the positioning trench 126 is formed on the second main body 120a. When the base 110 supports the electronic device 120 as shown in FIG. 1 so that each of the first connection portions 110b is aligned to each of the second connection portions 120b, the elastic component 124 pushes the driven portion 114a and the rotating component 114 is driven to rotate. Thereby, the positioning portion 114b moves from the first position P1 shown in FIG. 2A to the second position P2 shown in FIG. 2B and is engaged into the positioning trench 126, so that the electronic device 120 is positioned onto the base 110.

In the present embodiment, the first main body 110a has a first leaning surface S1 adjacent to the first connection portion 110b, and the second main body 120a has a second leaning surface S2 adjacent to the second connection portion 120b. Through the positioning method mentioned above, when the positioning portion 114b is engaged into the positioning trench 126, the elastic component 124 may eliminate the manufacturing and assembling tolerance between the base 110 and the electronic device 120 via its elastic deformation capability, such that the first leaning surface S1 may be completely lean against the second leaning surface S2. An undesired gap existing between the base 110 and the electronic device 120 due to the manufacturing and assembling tolerance could be avoided, and thereby the electronic device 120 supported on the base 110 does not wobble and the user may comfortably operate the electronic apparatus 100.

Referring to FIG. 2A and FIG. 2B, the second connection portion 120b includes an accommodating trench 129. The accommodating trench 129 is formed in the second main body 120a and used for accommodating at least a portion of the elastic component 124. Specifically, the elastic component 124 includes an elastic portion 124a and a propping portion 124b. The elastic portion 124a may be, for example, a spring, a rubber component, an elastic piece or other kinds of elastic body (depicted as a spring in the figure), and is connected between the second connection body 120a and the propping portion 124b. At least a portion of the propping portion 124b extends outside the accommodating trench 129 and is adapted to prop against the driven portion 114a as shown in FIG. 2B. In other embodiments, the elastic component 124 may be other suitable shapes, but the disclosure is not limited thereto.

The rotating component 114 of the present embodiment has a pivoting portion 114c. The pivoting portion 114c is located between the driven portion 114a and the positioning portion 114b, and the rotating component 114 is pivoted to the first main body 110a via the pivoting portion 114c. The rotating component 114 has a connecting portion 114d and the second connection portion 120b includes a magnetic component 128a. The connecting portion 114d is connected between the pivoting portion 114c and the positioning portion 114b, and the material of the connecting portion 114d may be a magnetizable material which could be attracted by a magnetic attraction force, for example. The magnetic component 128a may be a permanent magnet, for example, and is disposed on the second main body 120a and located between the elastic component 124 and the positioning trench 126. When the first connection portion 110b is aligned to the second connection portion 120b, the rotating component 114 is driven by the elastic component 124 propping against the driven portion 114a. In addition, the rotating component 114 is also driven by the magnetic attraction force between the magnetic component 128a and the connecting portion 114d. Therefore, the rotating component 114 rotates from the first position P1 shown in FIG. 2A to the second position P2 shown in FIG. 2B.

In the present embodiment, the material of the connecting portion 114d may be, for example, a magnetizable material, so that a magnetic attraction force may be generated between the connecting portion 114d and the magnetic component 128a. In other embodiments, another magnetic component may also be disposed in the connecting portion 114d so that a magnetic attraction force may be generated between the connecting portion 114d and the magnetic component 128a, but the disclosure is not limited thereto.

In addition, in the present embodiment, the first connection portion 110b includes a magnetic component 116a, and the second connection portion 120b includes a magnetic component 128b. The magnetic component 116a may be, for example, a permanent magnet and is disposed in the first main body 110a and aligned to the positioning portion 114b. The magnetic component 128b may be, for example, a permanent magnet and is disposed in the second main body 120a and aligned to the positioning trench 126. The material of the positioning portion 114b may be, for example, a magnetizable material which can be attracted by a magnetic attraction force. When the electronic device 120 shown in FIG. 1 is not placed on the base 110, the positioning portion 114b is adapted to be restricted at the first position P1 via a magnetic attraction force between the magnetic component 116a and the positioning portion 114b as shown in FIG. 2A, so as to avoid the positioning portion 114b unexpectedly extending outside the first connection portion 110b. When the electronic device 120 shown in FIG. 1 is placed on the base 110, the positioning portion 114b is adapted to be restricted at the second position P2 via a magnetic attraction force between the magnetic component 128b and the positioning portion 114b as shown in FIG. 2B, so that the positioning portion 114b is completely engaged into the positioning trench 126. In the present embodiment, the magnetic component 116a is disposed below the positioning portion 114b as shown in FIG. 2A, but the disclosure is not limited thereto. In other embodiments, the magnetic component 116a may be alternatively disposed at both sides of the positioning portion 114b or other suitable positions.

In the present embodiment, the material of the positioning portion 114b may be, for example, a magnetizable material, so that a magnetic attraction force may be generated between the positioning portion 114b and the magnetic component 116a or between the positioning portion 114b and the magnetic component 128b. In other embodiments, another magnetic component may also be disposed in the positioning portion 114b so as to generate a magnetic attraction force with the magnetic component 116a or the magnetic component 128b, but the disclosure is not limited thereto.

In the present embodiment, the positioning trench 126 has an inclined contact surface S3 therein, and the positioning portion 114b has another contact surface S4. When the positioning portion 114b is located at the first position P1 as shown in FIG. 2A, the contact surface S4 of the positioning portion 114b is horizontal. When the positioning portion 114b, along with the rotation of the rotating component 114, moves from the first position P1 shown in FIG. 2A to the second position P2 shown in FIG. 2B, the contact surface S4 of the positioning portion 114b becomes inclined and leans against the contact surface S3 in the positioning trench 126. More specifically, the magnetic component 128b may be exposed by the contact surface S3, for example. When the positioning portion 114b is engaged into the positioning trench 126, the positioning portion 114b may knock against the magnetic component 128b to produce a knocking sound, and thereby the user may notice that the electronic device 120 shown in FIG. 1 is firmly positioned onto the base 110.

Figure 3:
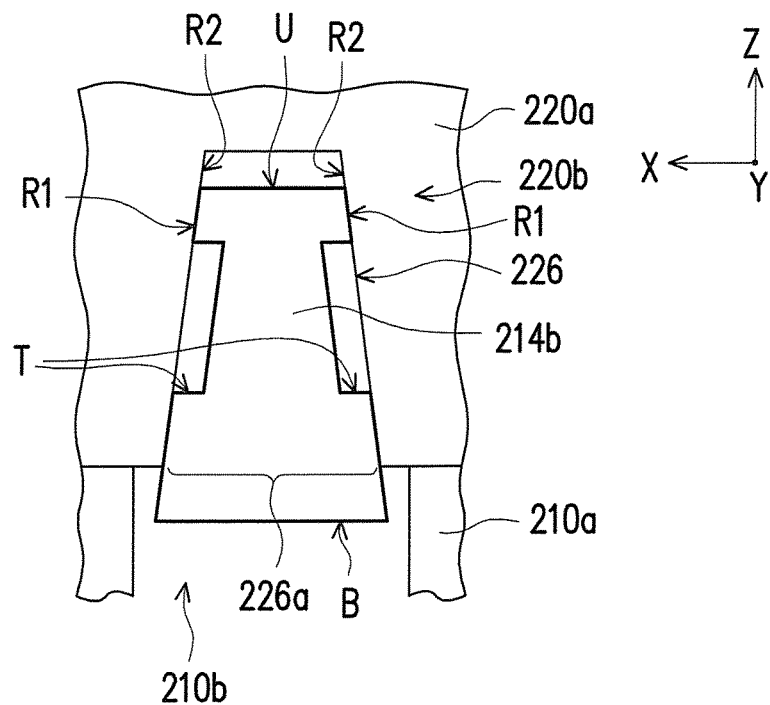
FIG. 3 is a schematic cross sectional view illustrating that a positioning portion is engaged into a positioning trench according to another embodiment of the disclosure.

FIG. 3 is a schematic cross sectional view illustrating that a positioning portion is engaged into a positioning trench according to another embodiment of the disclosure. In the embodiment shown in FIG. 3, the configuration in reference axes X, Y, Z and actions of the first main body 210a, the first connection portion 210b, the positioning portion 214b, the second main body 220a, the second connection portion 220b and the positioning trench 226 are similar to the configuration in reference axes X, Y, Z and actions of the first main body 110a, the first connection portion 110b, the positioning portion 114b, the second main body 120a, the second connection portion 120b and the positioning trench 126 shown in FIG. 2A and FIG. 2B, and it is not repeated herein. Features of the other structures according to the embodiment of FIG. 3 are described below.

In the embodiment of FIG. 3, the positioning portion 214b has a bottom side B and a top side U opposite to each other and two first inclined surfaces R1 opposite to each other. By forming the two first inclined surfaces R1 on the positioning portion 214b, the outer diameter of the positioning portion 214b shown in the cross sectional view of FIG. 3 gradually decreases from the bottom side B to the top side U. Correspondingly, the positioning trench 226 has an opening end 226a and the positioning trench 226 has two opposite second inclined surfaces R2 therein. The positioning portion 214b is adapted to be engaged into the positioning trench 226 from the opening end 226a. By forming the two second inclined surfaces R2 in the positioning trench 226, the inner diameter of the positioning trench 226 shown in the cross sectional view of FIG. 3 gradually decreases from the opening end 226a to the inside of the positioning trench 226. The inclinations of the two first inclined surfaces R1 are designed to be respectively equal to the inclinations of the two second inclined surfaces R2, such that the positioning portion 214b and the positioning trench 226 shown in the cross sectional view of FIG. 3 may have the same taper. Through the taper cooperating way as mentioned above, when the positioning portion 214b is engaged into the positioning trench 226 as shown in FIG. 3, the two first inclined surfaces R1 may lean against the two second inclined surfaces R2 respectively. Therefore, the positioning portion 214b and the inner wall of the positioning trench 226 are closely connected and no undesired gap exists therebetween, so as to avoid the electronic device 120 supported on the base 110 wobbling.

Further, in the embodiment of FIG. 3, the positioning portion 214b has at least one recess T (depicted as one in the figure) formed on each of the first inclined surfaces R1 such that the contact area between the positioning portion 214b and the inner wall of the positioning trench 226 may be reduced, so as to reduce the friction force generated when the positioning portion 214b is engaged into the positioning trench 226. The shape and the number of the recesses T are not limited by the disclosure and may be other suitable shapes or other suitable numbers, examples are as follows.

Figure 4:
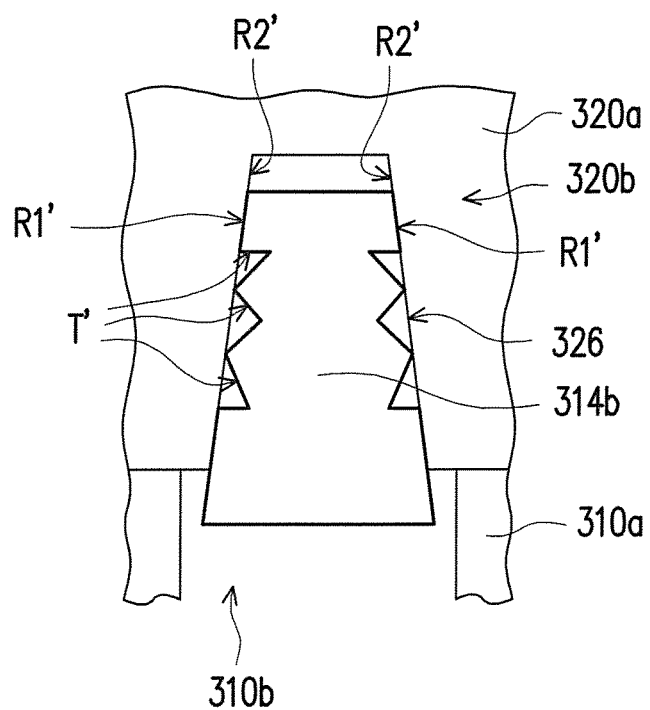
FIG. 4 is a schematic cross sectional view illustrating that a positioning portion is engaged into a positioning trench according to another embodiment of the disclosure.

FIG. 4 is a schematic cross sectional view illustrating that a positioning portion is engaged into a positioning trench according to another embodiment of the disclosure. In the embodiment shown in FIG. 4, the configuration and actions of the first main body 310a, the first connection portion 310b, the positioning portion 314b, the second main body 320a, the second connection portion 320b, the positioning trench 326, the first inclined surfaces R1' and the second inclined surfaces R2' are similar to the configuration and actions of the first main body 210a, the first connection portion 210b, the positioning portion 214b, the second main body 220a, the second connection portion 220b, the positioning trench 226, the first inclined surfaces R1 and the second inclined surfaces R2 shown in FIG. 3, and it is not repeated herein. The difference between the embodiment shown in FIG. 4 and the embodiment shown in FIG. 3 is that, more than one recesses T' are formed on each of the first inclined surfaces R1' (depicted as three in the figure). The positioning portion 314b between the two adjacent recesses T' leans against the inner wall of the positioning trench 326 in a manner of line contact or point contact, so as to maintain the engaging stability between the positioning portion 314 and the positioning trench 326 and the friction force may be reduced by reducing the contact area between the positioning portion 314b and the inner wall of the positioning trench 326.

Figure 5A:
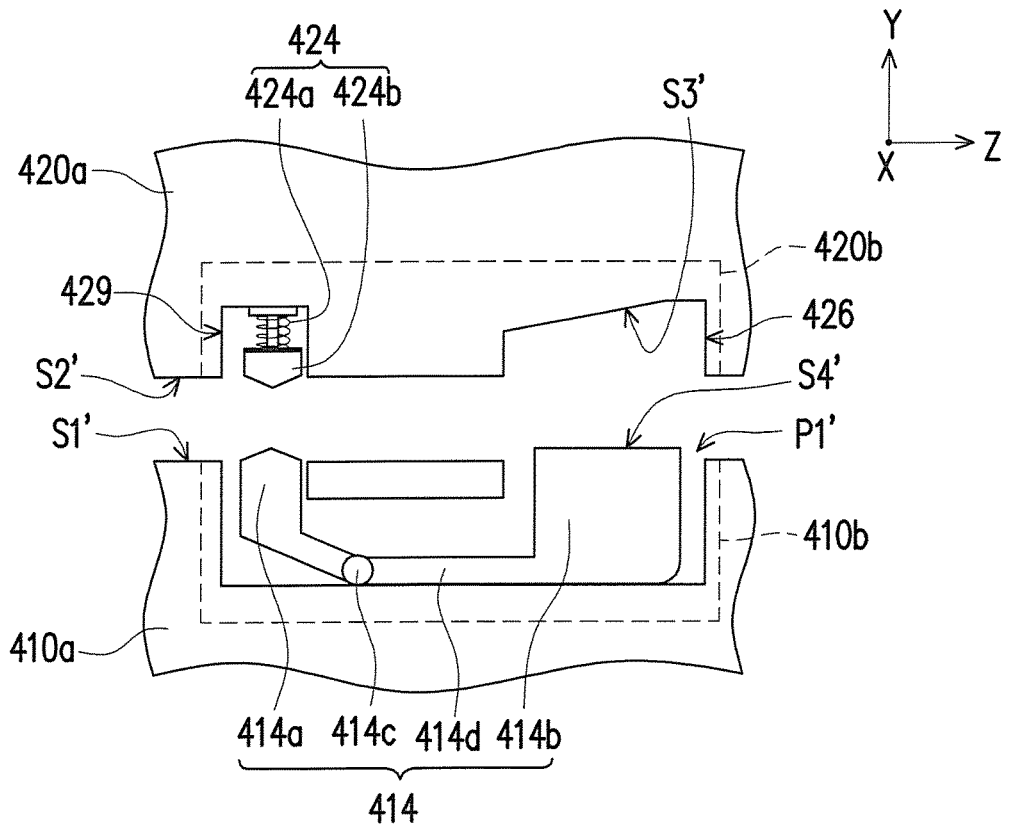
FIG. 5A is a schematic view illustrating that a first connection portion and a second connection portion are separated from each other according to another embodiment of the disclosure.
Figure 5B:
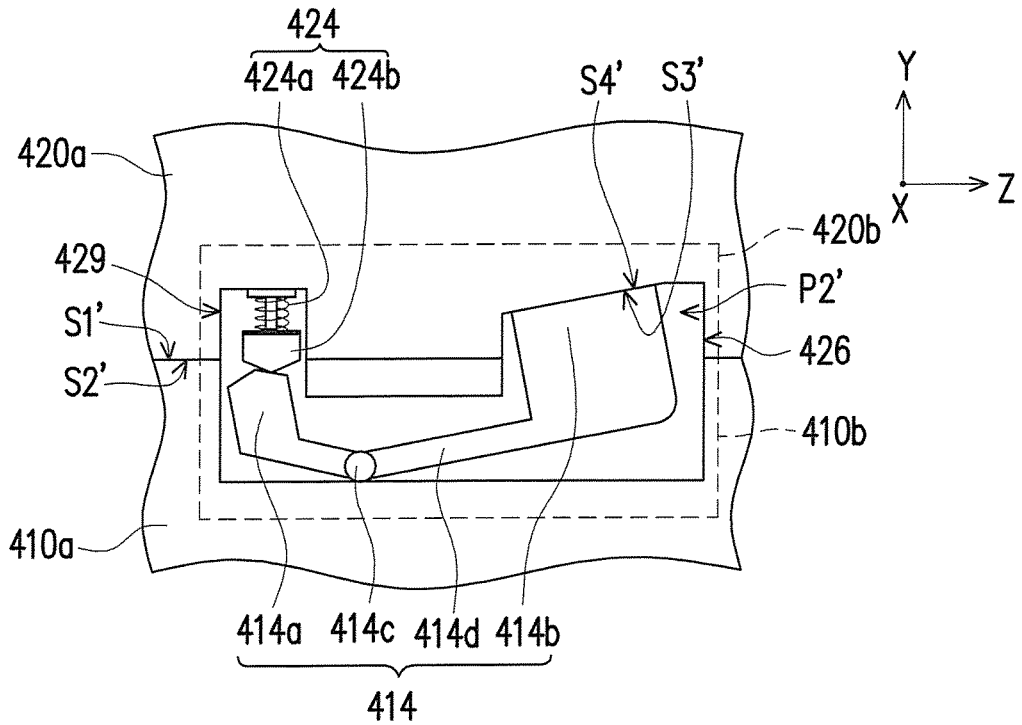
FIG. 5B is a schematic view illustrating that the first connection portion and the second connection portion of FIG. 5A are connected to each other.

FIG. 5A is a schematic view illustrating that a first connection portion and a second connection portion are separated from each other according to another embodiment of the disclosure. FIG. 5B is a schematic view illustrating that the first connection portion and the second connection portion of FIG. 5A are connected to each other. In the embodiment shown in FIG. 5A and FIG. 5B, the configuration and actions of the first main body 410a, the first connection portion 410b, the rotating component 414, the driven component 414a, the positioning portion 414b, the pivoting portion 414c, the connecting portion 414d, the second main body 420a, the second connection portion 420b, the elastic component 424, the elastic portion 424a, the propping portion 424b, the positioning trench 426, the accommodating trench 429, the first position P1', the second position P2', the first leaning surface S1', the second leaning surface S2', the contact surface S3' and the contact surface S4' are similar to the configuration and actions of the first main body 110a, the first connection portion 110b, the rotating component 114, the driven component 114a, the positioning portion 114b, the pivoting portion 114c, the connecting portion 114d, the second main body 120a, the second connection portion 120b, the elastic component 124, the elastic portion 124a, the propping portion 124b, the positioning trench 126, the accommodating trench 129, the first position P1, the second position P2, the first leaning surface S1, the second leaning surface S2, the contact surface S3 and the contact surface S4 shown in FIG. 2A and FIG. 2B, and it is not repeated herein.

The difference between the embodiment shown in FIG. 5A and FIG. 5B and the embodiment shown in FIG. 2A and FIG. 2B is that, the magnetic components 116a, 128a, 128b in FIG. 2A and FIG. 2B are not disposed in the embodiment shown in FIG. 5A and FIG. 5B. The rotating component 414 is merely driven by the elastic component 424 propping against the driven portion 414a to rotate from the first position P1' shown in FIG. 5A to the second position P2' shown in FIG. 5B.

Figure 6:
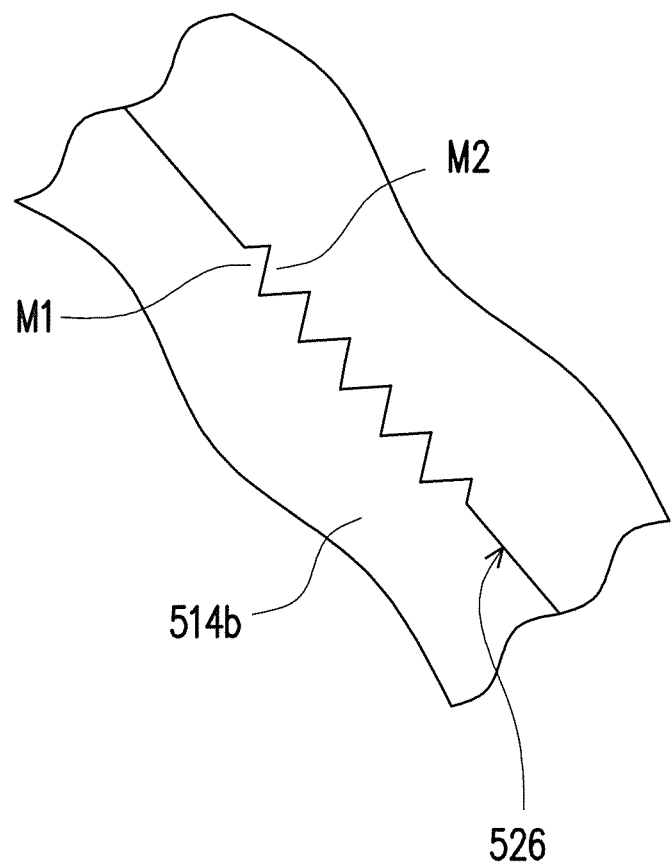
FIG. 6 is a schematic partially enlarged view illustrating that a positioning portion is positioned in a positioning trench according to another embodiment of the disclosure.

FIG. 6 is a schematic partially enlarged view illustrating that a positioning portion is positioned in a positioning trench according to another embodiment of the disclosure. Referring to FIG. 6, in the present embodiment, the positioning portion 514b has a first aligning micro structure M1 thereon, and the positioning trench 526 has a second aligning micro structure M2 therein. When the positioning portion 514b is engaged into the positioning trench 526, the first aligning micro structure M1 leans against the second aligning micro structure M2 so as to enhance the alignment accuracy of the positioning portion 514b and the positioning trench 526.

In light of the foregoing, according to the electronic apparatus of the disclosure, when the base supports the electronic device, the elastic component of the second connection portion props against the driven portion of the rotating component of the first connection portion, so that the positioning portion of the rotating component is engaged into the positioning trench of the second connection portion, and thereby the electronic device is further firmly positioned onto the base. Through such positioning method, the elastic component may eliminate the manufacturing and assembling tolerance between the base and the electronic device via its elastic deformation capability, so as to avoid an undesired gap existing between the base and the electronic device due to the manufacturing and assembling tolerance, thereby the electronic device supported on the base does not wobble and the user may comfortably operate the electronic apparatus. By designing the inclinations of the two first inclined surfaces on the positioning portion respectively equal to the inclinations of the two second inclined surfaces in the positioning trench, the two first inclined surfaces may lean against the two second inclined surfaces respectively when the positioning portion is engaged into the positioning trench. Therefore, the positioning portion and the inner wall of the positioning trench are closely connected and no undesired gap exists therebetween, so as to effectively avoid the electronic device supported on the base wobbling.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An electronic apparatus, comprising:
a base, comprising a first main body and at least one first connection portion, wherein the first connection portion comprises a rotating component, the rotating component is pivoted to the first main body and has a driven portion and a positioning portion; and
an electronic device, comprising a second main body and at least one second connection portion, wherein the second connection portion comprises an elastic component and a positioning trench, the elastic component is connected to the second main body, the positioning trench is formed on the second main body, when the base supports the electric device so that the first connection portion is aligned to the second connection portion, the elastic component pushes the driven portion, such that the positioning portion is engaged into the positioning trench.

2. The electronic apparatus as claimed in claim 1, wherein the rotating component has a pivoting portion and is pivoted to the first main body via the pivoting portion, wherein the pivoting portion is located between the driven portion and the positioning portion.

3. The electronic apparatus as claimed in claim 2, wherein the rotating component has a connecting portion, the connecting portion is composed of a magnetic material or the connecting portion comprises a magnetic component, the connecting portion is connected between the pivoting portion and the positioning portion, the second connection portion comprises another magnetic component, the another magnetic component is disposed in the second main body, when the first connection portion is aligned to the second connection portion, a magnetic attraction force between the another magnetic component and the connecting portion drives the rotating component to rotate.

4. The electronic apparatus as claimed in claim 3, wherein the another magnetic component is disposed between the elastic component and the positioning trench.

5. The electronic apparatus as claimed in claim 1, wherein the second connection portion comprises an accommodating trench, the accommodating trench is formed in the second main body and accommodates at least a portion of the elastic component.

6. The electronic apparatus as claimed in claim 1, wherein the elastic component comprises an elastic portion and a propping portion, the elastic portion is connected between the second main body and the propping portion, the propping portion is adapted to prop the driven portion.

7. The electronic apparatus as claimed in claim 1, wherein the positioning trench has a contact surface therein, the positioning portion has another contact surface, when the positioning portion is engaged into the positioning trench, the another contact surface of the positioning portion is inclined and leans against the contact surface in the positioning trench.

8. The electronic apparatus as claimed in claim 1, wherein the positioning portion is composed of a magnetic material or the positioning portion comprises a magnetic component.

9. The electronic apparatus as claimed in claim 8, wherein the first connection portion comprises another magnetic component, the another magnetic component is disposed in the first main body and aligned to the positioning portion, and the positioning portion is adapted to be restricted via a magnetic attraction force between the another magnetic component and the positioning portion.

10. The electronic apparatus as claimed in claim 8, wherein the second connection portion comprises another magnetic component, the another magnetic component is disposed in the second main body and aligned to the positioning trench, and the positioning portion is adapted to be restricted via a magnetic attraction force between the another magnetic component and the positioning portion.

11. The electronic apparatus as claimed in claim 1, wherein the positioning portion has a bottom side and a top side opposite to each other, an outer diameter of the positioning portion decreases gradually from the bottom side to the top side.

12. The electronic apparatus as claimed in claim 1, wherein the positioning trench has an opening end, the positioning portion is adapted to be engaged into the positioning trench from the opening end, an inner diameter of the positioning trench decreases gradually from the opening end to an inside of the positioning trench.

13. The electronic apparatus as claimed in claim 1, wherein the positioning portion has two first inclined surfaces opposite to each other, the positioning trench has two second inclined surfaces opposite to each other therein, inclinations of the two first inclined surfaces and inclinations of the two second inclined surfaces are the same respectively, when the positioning portion is engaged into the positioning trench, the two first inclined surfaces lean against the two second inclined surfaces respectively.

14. The electronic apparatus as claimed in claim 13, wherein the positioning portion has at least one recess on each of the two first inclined surfaces.

15. The electronic apparatus as claimed in claim 1, wherein the first main body has a first leaning surface adjacent to the first connection portion, the second main body has a second leaning surface adjacent to the second connection portion, when the positioning portion is engaged into the positioning trench, the first leaning surface leans against the second leaning surface.

16. The electronic apparatus as claimed in claim 1, wherein the positioning portion has a first aligning micro structure thereon, the positioning trench has a second aligning micro structure therein, when the positioning portion is engaged into the positioning trench, the first aligning micro structure leans against the second aligning micro structure.

17. An electronic device, connected with a base to form an electronic apparatus, the electronic device comprising:
a main body and at least one connection portion, wherein the connection portion comprises an elastic component and a positioning trench, the elastic component is connected to the main body, and the positioning trench is formed on the main body;
wherein when the electronic device and the base are connected, the elastic component pushes a rotating component of the base, such that a positioning portion of the rotating component is engaged into the positioning trench of the electronic device.

18. The electronic device as claimed in claim 17, wherein the connection portion comprises an accommodating trench, the accommodating trench is formed in the main body and accommodates at least a portion of the elastic component.

19. The electronic device as claimed in claim 17, wherein the elastic component comprises an elastic portion and a propping portion, the elastic portion is connected between the main body and the propping portion, and the propping portion is adapted to prop the rotating component.

20. The electronic device as claimed in claim 17, wherein the positioning trench has a contact surface therein, when the positioning portion is engaged into the positioning trench, the positioning portion leans against the contact surface in the positioning trench.

21. The electronic device as claimed in claim 17, wherein the connection portion comprises a magnetic component, the magnetic component is disposed in the main body and aligned to the positioning trench, and the positioning portion is adapted to be restricted via a magnetic attraction force between the magnetic component and the positioning portion.

22. The electronic device as claimed in claim 17, wherein the positioning trench has an opening end, the positioning portion is adapted to be engaged into the positioning trench from the opening end, an inner diameter of the positioning trench decreases gradually from the opening end to an inside of the positioning trench.

23. The electronic device as claimed in claim 17, wherein the positioning portion has two first inclined surfaces opposite to each other, the positioning trench has two second inclined surfaces opposite to each other therein, inclinations of the two first inclined surfaces and inclinations of the two second inclined surfaces are the same respectively, when the positioning portion is engaged into the positioning trench, the two first inclined surfaces lean against the two second inclined surfaces respectively.

24. The electronic device as claimed in claim 17, wherein the main body has a leaning surface adjacent to the connection portion, when the positioning portion is engaged into the positioning trench, the base leans against the leaning surface.

25. The electronic device as claimed in claim 17, wherein the positioning portion has a first aligning micro structure thereon, the positioning trench has a second aligning micro structure therein, when the positioning portion is engaged into the positioning trench, the first aligning micro structure leans against the second aligning micro structure.

* * * * *